United States Patent [19]

Willis et al.

[11] Patent Number: 5,916,355
[45] Date of Patent: Jun. 29, 1999

[54] CORROSION INHIBITOR FOR MAGNETIC MEDIA

[75] Inventors: Rymer Steven Willis, Newton; Scott Riley Brown, Ozark, both of Ala.

[73] Assignees: Sony Corporation, Tokyo, Japan; Sony Electronics Inc., Park Ridge, N.J.

[21] Appl. No.: 09/132,039

[22] Filed: Aug. 11, 1998

[51] Int. Cl.⁶ .............. C23F 11/00; H01F 10/16; H01F 10/12
[52] U.S. Cl. .................. 106/14.42; 252/62.55; 427/127; 427/130; 427/131; 427/548; 428/447; 428/450; 428/689; 428/692; 428/694 R; 428/694 TF; 428/694 TP; 428/900; 428/928
[58] Field of Search ............ 106/14.42; 427/127, 427/130, 131, 548; 428/900, 689, 692, 694 R, 694 TP, 928, 447, 450, 694 TF; 252/62.55

[56] References Cited

U.S. PATENT DOCUMENTS

| 4,153,754 | 5/1979 | Huisman | 428/539 |
| 4,719,121 | 1/1988 | Kimball | 427/48 |

OTHER PUBLICATIONS

Sony Magnetic Products Group, MPG Technical Report, vol. 1, "Hi8 Metal–E' Metal–Evaporated Tape", Aug. 1989, Tokyo, Japan.

Chemical Abstract No. 98:112274, abstract of Japanese Patent Specification No. 57–174176, Oct. 1982.

WPIDS Abstract No. 95–164625, abstract of Japanese Patent Specification No. 07–085460, Mar. 1995.

WPIDS Abstract No. 85–306249, abstract of Japanese Patent Specification No. 60–211613, Oct. 1985.

WPIDS Abstract No. 85–119299, abstract of Japanese Patent Specification No. 60–057525, Apr. 1985.

*Primary Examiner*—Anthony Green
*Attorney, Agent, or Firm*—Wood, Herron & Evans, L.L.P.

[57] ABSTRACT

A surface treatment is provided for magnetic media, in particular metal evaporated magnetic tape, that prevents or reduces corrosion in the media. A corrosion inhibitor and a coupling agent are added to a carrier, such as ethanol, and applied directly to the magnetic media. The corrosion inhibitor is advantageously a derivative of sarcosine, preferably N-methyl-N-(1-oxo-9-octadeconyl)glycine, and is added in an amount up to about 0.5 wt. %. The coupling agent is advantageously an organofunctional silane, preferably 3-glycidoxypropyltrimethoxysilane, and is added in an amount up to about 0.3 wt. %. This formula is particularly suitable for preventing corrosion in cobalt evaporated magnetic tape.

8 Claims, No Drawings

CORROSION INHIBITOR FOR MAGNETIC MEDIA

FIELD OF THE INVENTION

This invention relates to the prevention or reduction of corrosion in magnetic media.

BACKGROUND OF THE INVENTION

Magnetic media, such as magnetic tape, is produced in one of two ways. In the first method, a base film, typically polyethylene teraphthalate or polyethylene naphthalate, is painted with a magnetic coating, such as cobalt or a cobalt/nickel alloy. In the second method, referred to as vacuum deposition, metal placed in a vacuum evaporates and is deposited onto the base film. The media produced by this second method is called metal evaporated magnetic media (MEMM). The MEMM exhibits superior video properties as compared to media produced by the first method. For example, MEMM exhibits improved frequency response, recording density and luminance signal, and reduced modulation noise. The MEMM, however, is susceptible to corrosion from moisture and carbon dioxide in the air. Thus, there is a need for a corrosion inhibiting surface treatment that will minimize or prevent corrosion in MEMM. To date, no such treatment has been developed that sufficiently solves the problem.

SUMMARY OF THE INVENTION

The present invention provides a surface treatment for metal evaporated magnetic media that demonstrates superior performance in preventing or reducing corrosion. There is provided a corrosion inhibitor solution in which a corrosion inhibitor and a coupling agent are added to a carrier, preferably ethanol, and applied directly to the magnetic media. The corrosion inhibitor is advantageously a derivative of sarcosine, preferably N-methyl-N-(1-oxo-9-octadeconyl)glycine, and the coupling agent is advantageously an organofunctional silane, preferably 3-glycidoxypropyl-trimethoxysilane. In a preferred embodiment of the present invention, N-methyl-N-(1-oxo-9-octadeconyl)glycine is added to ethanol in an amount up to about 0.5 wt. %, advantageously about 0.2 to 0.4 wt. %, and 3-glycidoxypropyltrimethoxysilane is added to the ethanol in an amount up to about 0.3 wt. %, advantageously about 0.1 to 0.2 wt. %, and the resulting solution is applied directly to a cobalt evaporated magnetic tape.

These and other objects and advantages of the present invention shall become more apparent from the accompanying drawings and description thereof.

DETAILED DESCRIPTION

To develop a corrosion-inhibiting formulation for treating MEMM, a number of experiments were run in which various known corrosion inhibitors were added to an ethanol carrier with or without a coupling agent and coated on a reel of cobalt evaporated magnetic tape. The coating was accomplished by passing the reel of tape through a room temperature coating solution at a line speed of 3 m/min and then between a series of rollers that apply a fixed tension to the tape surface. In particular, the tape path used in this test had three rollers, the first being the take-up hub applying 13 g of tension (as measured by a tensilometer), the second being a capstan applying 17 g of tension, and the third being a supply hub applying 30 g of tension. The path in the coating machine through which the reel of tape is run should not include sharp turns or the like, as that may cause mechanical damage to the tape. The coating machine is equipped with one or more heaters to dry the coating and to evaporate the ethanol, leaving a layer of the corrosion inhibitor on the surface of the magnetic media. In this case, two heaters, each having a different tape path with a line speed of 3 m/min., applied a temperature of 50° C. for a total of 12 to 13 seconds in an ambient atmosphere. It is to be understood, however, that any other suitable method of drying the tape may be used.

Once the coating was dry, the reel of tape was placed in an environmental chamber having an increased temperature of about 60° C., increased humidity of about 90% relative humidity, and an increased $CO_2$ level of about 50%. The reel of tape was left in the chamber for 7 days, then removed and placed in a desiccator, which is a cabinet with a controlled atmosphere, low humidity and non-elevated temperature. The tape was examined under the microscope for visual signs of degradation. Then a Vibrating Sample Magnetometer (VSM) was used to measure the magnetic characteristics of the tape, such as the percent demagnetization, magnetization and coercivity. A measurement of the magnetization was also taken after coating the reels, but before placement in the environmental chamber and at an intermediate point of 5 days. Magnetization, as used herein, is the amount of magnetic strength or flux that the material possesses at the time of measurement. Demagnetization is a measure of the amount of reduction in magnetic strength or flux as a result of exposure to a corrosive environment. The lower the percent demagnetization, the better the video properties. Because of inherent inconsistencies in the tape itself, the VSM values were used in conjunction with the optical examination to determine the effectiveness of the corrosion-inhibiting formulation.

The formulations tested in this second set of tests are shown in Table 1 and the results of the tests are given in Table 2.

TABLE 1

Formulations for Corrosion Inhibitor Solutions

| Formula Number | Inhibitor 0.30 wt. % | Coupling Agent 0.15 wt. % | Carrier balance wt. % |
| --- | --- | --- | --- |
| SW 46 | 2,3 Naphthalenediol | None | Ethanol |
| SW 47 | 2,3 Naphthalenediol | methanol, N-butyl alcohol, aminoethylaminopropyl trimethoxysilane | Ethanol |
| SW 48 | 2,3 Naphthalenediol | silicone glycol copolymer | Ethanol |
| SW 49 | 2,3 Naphthalenediol | 3-glycidoxypropyl trimethoxysilane | Ethanol |
| SW 50 | N-methyl-N-(1-oxo-9 octadeconyl)glycine | None | Ethanol |
| SW 51 | N-methyl-N-(1-oxo-9 octadeconyl)glycine | methanol, N-butyl alcohol, aminoethylaminopropyl trimethoxysilane | Ethanol |
| SW 52 | N-methyl-N-(1-oxo-9 octadeconyl)glycine | silicone glycol copolymer | Ethanol |
| SW 53 | N-methyl-N-(1-oxo-9- octadeconyl)glycine | 3-glycidoxypropyl trimethoxysilane | Ethanol |
| SW 54 | Vanlube NA | None | Ethanol |
| SW 55 | Vanlube NA | methanol, N-butyl alcohol, aminoethylaminopropyl trimethoxysilane | Ethanol |
| SW 56 | Vanlube NA | silicone glycol copolymer | Ethanol |

TABLE 1-continued

Formulations for Corrosion Inhibitor Solutions

| Formula Number | Inhibitor 0.30 wt. % | Coupling Agent 0.15 wt. % | Carrier balance wt. % |
|---|---|---|---|
| SW 57 | Vanlube NA | 3-glycidoxypropyl trimethoxysilane | Ethanol |
| SW 58 | 2,3 Naphthalenediol | gamma-aminopropyl triothoxysilane | Ethanol |
| SW 59 | 2,3 Naphthalenediol | methacryloxpropyl triethoxysilane, silane esters | Ethanol |

TABLE 2

Magnetic Characteristics of Surface Treated Magnetic Tape

| Formula Number | Magnetization (Maxwells) | | | % Demagnetization | |
|---|---|---|---|---|---|
| | Day 0 | Day 5 | Day 7 | Day 5 | Day 7 |
| SW 46 | 0.0639 | 0.0586 | 0.0592 | 8.3 | 7.4 |
| SW 47 | 0.0669 | 0.0597 | 0.0590 | 10.8 | 11.8 |
| SW 48 | 0.0659 | 0.0602 | 0.0590 | 8.6 | 10.5 |
| SW 49 | 0.0685 | 0.0586 | 0.0603 | 14.5 | 12.0 |
| SW 50 | 0.0650 | 0.0598 | 0.0606 | 7.6 | 6.8 |
| SW 51 | 0.0653 | 0.0593 | 0.0596 | 9.2 | 8.7 |
| SW 52 | 0.0632 | 0.0611 | 0.0584 | 3.3 | 7.6 |
| SW 53 | 0.0632 | 0.0598 | 0.0603 | 5.4 | 4.6 |
| SW 54 | 0.0683 | 0.0597 | 0.0600 | 12.6 | 12.2 |
| SW 55 | 0.0675 | 0.0592 | 0.0596 | 12.3 | 11.7 |
| SW 56 | 0.0638 | 0.0616 | 0.0601 | 3.4 | 5.8 |
| SW 57 | 0.0650 | 0.0600 | 0.0606 | 7.7 | 6.8 |
| SW 58 | 0.0673 | 0.0604 | 0.0599 | 10.3 | 11.0 |
| SW 59 | 0.0661 | 0.0598 | 0.0592 | 9.5 | 10.4 |

The results show that cobalt evaporated magnetic tape treated with formula SW 53 exhibits the most favorable magnetic characteristics after exposure to a corrosive atmosphere. The SW 53 formula is comprised of a corrosion inhibitor that is a derivative of sarcosine, and a couple agent that is an organofunctional silane, namely N-methyl-N-(1-oxo-9-octadeconyl)-glycine and 3-glycidoxypropyl-trimethoxysilane, respectively. In comparison, the SW 53-treated tape displayed a magnetization higher or similar to the other treated tapes and a considerably lower percent demagnetization. Furthermore, the values measured were consistent with each other, taking into consideration the variance of the measurements, and the optical examination confirmed the reliability of the values. To confirm the finding that the SW 53 formula produced the best results, an additional test was run to compare the SW 53-treated tape to untreated tape, to tape treated with the previously used SW 46 formula, and to ready-for-purchase tape, which has been treated with SW 46 and lubricant coated. The results are given in Table 3.

TABLE 3

| | Comparison | | | |
|---|---|---|---|---|
| Sample | Inhibitor 0.3 wt. % | Coupling Agent 0.15 wt. % | % Demagnetization | |
| | | | Day 5 | Day 7 |
| SW 53 Tape | N-methyl-N-(1-oxo-9-octadeconyl) glycine | 3-glycidoxypropyl trimethoxysilane | 5.4 | 4.6 |
| SW46 Tape | 2,3 Naphthalenediol | None | 8.3 | 7.4 |
| Ready-to-Purchase SW46 Tape | 2,3 Naphthalenediol | None | 10.3 | 11.3 |
| Untreated Tape | None | None | 13.9 | 15.5 |

Table 3 shows that magnetic tape treated with the SW 53 solution is superior to that of tape treated with the previously used solution and far superior to untreated tape. Thus, MEMM that is surface treated with a solution of up to about 0.5 wt. %, advantageously 0.2 to 0.3 wt. %, N-methyl-N-(1-oxo-9-octadeconyl)-glycine and up to about 0.3 wt. %, advantageously 0.1 to 0.2 wt. %, 3-glycidoxypropyl-trimethoxysilane in ethanol has been found to demonstrate a decreased tendency toward corrosion.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, carriers other than ethanol may be used, such as toluene, provided that the additives are soluble therein and the additives are miscible with each other in the carrier. The invention in its broader aspects is therefore not limited to the specific details, method and illustrative examples shown and described. Accordingly, departures may be made from such details without departing from the scope or spirit of applicant's general inventive concept.

What is claimed is:

1. A corrosion inhibitor solution comprised of a corrosion inhibitor in an amount up to about 0.5 wt. % and a coupling agent in an amount up to about 0.3 wt. % in a carrier, wherein the corrosion inhibitor is N-methyl-N-(1-oxo-9-octadeconyl)-glycine and the coupling agent is 3-glycidoxypropyltrimethoxysilane, and wherein the solution is used for the surface treatment of magnetic media.

2. The solution of claim 1, wherein the carrier is ethanol.

3. The solution of claim 1, wherein the solution contains about 0.2 to 0.4 wt. % of the corrosion inhibitor.

4. The solution of claim 3, wherein the solution contains 0.1 to 0.2 wt. % of the coupling agent.

5. The solution of claim 1, wherein the solution contains 0.1 to 0.2 wt. % of the coupling agent.

6. A method of inhibiting corrosion on the surface of cobalt evaporated magnetic tape comprising the steps of:

preparing a coating solution containing a corrosion inhibitor in an amount up to about 0.5 wt. %, a coupling agent in an amount up to about 0.3 wt. %, and a carrier, wherein the corrosion inhibitor is N-methyl-N-(1-oxo-9-octadeconyl)glycine and the coupling agent is 3-glycidoxypropyltrimethoxysilane; and applying the coating solution to the tape.

7. A corrosion-resistant magnetic media comprising:
a base film;
a layer of magnetic media adhered to the base film; and
a corrosion inhibiting coating on the magnetic media layer comprising N-methyl-N-(1-oxo-9-octadeconyl)-glycine and 3-glycidoxypropyltrimethoxysilane.

8. The corrosion-resistant magnetic media of claim 7, wherein the magnetic media is vacuum deposited on the base film, and is selected from the group consisting of cobalt and cobalt/nickel alloy.

* * * * *